(12) United States Patent
Cai et al.

(10) Patent No.: US 8,898,991 B2
(45) Date of Patent: Dec. 2, 2014

(54) WIND TURBINE TOWER BASE ASSEMBLY WITH DETACHABLE TOWER BASE RINGS

(75) Inventors: Ying Xia Cai, Greenville, SC (US); William Francis Gevers, Simpsonville, SC (US); Roman Kolar, Hendersonville, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/606,177

(22) Filed: Sep. 7, 2012

(65) Prior Publication Data

US 2014/0069046 A1 Mar. 13, 2014

(51) Int. Cl.
*E04B 1/38* (2006.01)
*E02D 27/42* (2006.01)

(52) U.S. Cl.
USPC ............. 52/651.01; 52/295; 52/296; 248/678

(58) Field of Classification Search
CPC ........ E04H 12/08; F03D 11/04; Y02E 10/728
USPC ........... 52/292, 295, 296, 651.01, 831, 169.9; 248/218.4, 219.1, 507, 346.03, 678, 248/188.8, 357; 416/DIG. 6
See application file for complete search history.

(56) References Cited

U.S. PATENT DOCUMENTS

| 3,645,057 | A | * | 2/1972 | Kaplan | 52/295 |
|---|---|---|---|---|---|
| 3,671,738 | A | * | 6/1972 | Beachley | 362/431 |
| 3,837,752 | A | * | 9/1974 | Shewchuk | 403/2 |
| 4,469,956 | A | * | 9/1984 | D'Amato | 290/55 |
| 4,674,907 | A | * | 6/1987 | Shewchuk | 403/2 |
| 4,793,111 | A | * | 12/1988 | Shewchuk | 52/298 |
| 5,481,835 | A | * | 1/1996 | Bloom | 52/98 |
| 6,532,700 | B1 | | 3/2003 | Maliszewski et al. | |
| 6,868,641 | B2 | * | 3/2005 | Conner et al. | 52/98 |
| 7,155,875 | B2 | | 1/2007 | Henderson | |
| 7,533,506 | B2 | * | 5/2009 | Platt | 52/296 |
| 7,805,895 | B2 | | 10/2010 | Kristensen | |
| 8,051,627 | B2 | | 11/2011 | Schiffer et al. | |
| 8,164,210 | B2 | | 4/2012 | Boone et al. | |
| 2003/0196393 | A1 | * | 10/2003 | Bowman et al. | 52/295 |
| 2003/0233793 | A1 | * | 12/2003 | Burkart et al. | 52/165 |
| 2010/0024311 | A1 | | 2/2010 | Wambeke et al. | |
| 2011/0154777 | A1 | | 6/2011 | Bagepalli | |
| 2012/0260592 | A1 | * | 10/2012 | Wolf | 52/296 |

FOREIGN PATENT DOCUMENTS

| EP | 1 526 298 A2 | | 4/2005 |
|---|---|---|---|
| WO | WO 2011047723 A1 | * | 4/2011 |

* cited by examiner

*Primary Examiner* — Brian Glessner
*Assistant Examiner* — Jessie Fonesca
(74) *Attorney, Agent, or Firm* — Dority & Manning, P.A.

(57) ABSTRACT

A tower base ring assembly is provided for securing a wind turbine tower to a foundation. A top ring is configured for securing to a wind turbine tower. A bottom ring has an open center and a plurality of radially oriented troughs spaced circumferentially about the open center, with each trough having an outer end. The top ring and the bottom ring are detachable from one another, and the tower base ring assembly is connectable to the foundation.

13 Claims, 9 Drawing Sheets

SECTION A-A

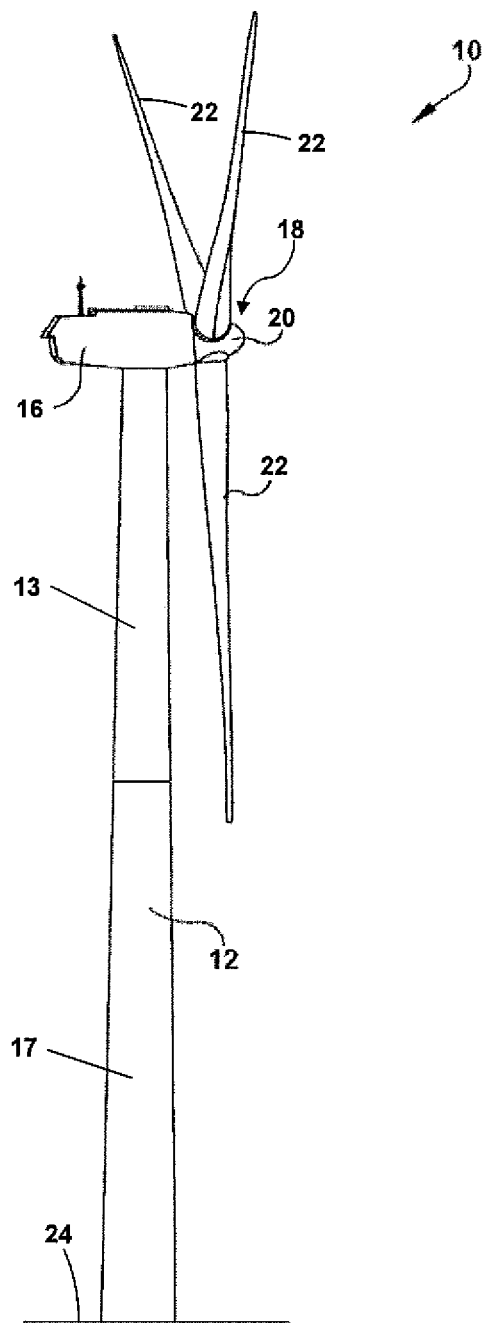
FIG. -1-

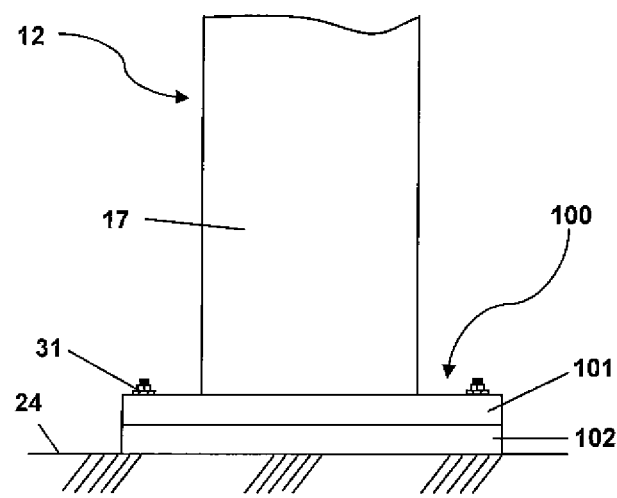
FIG. -2-

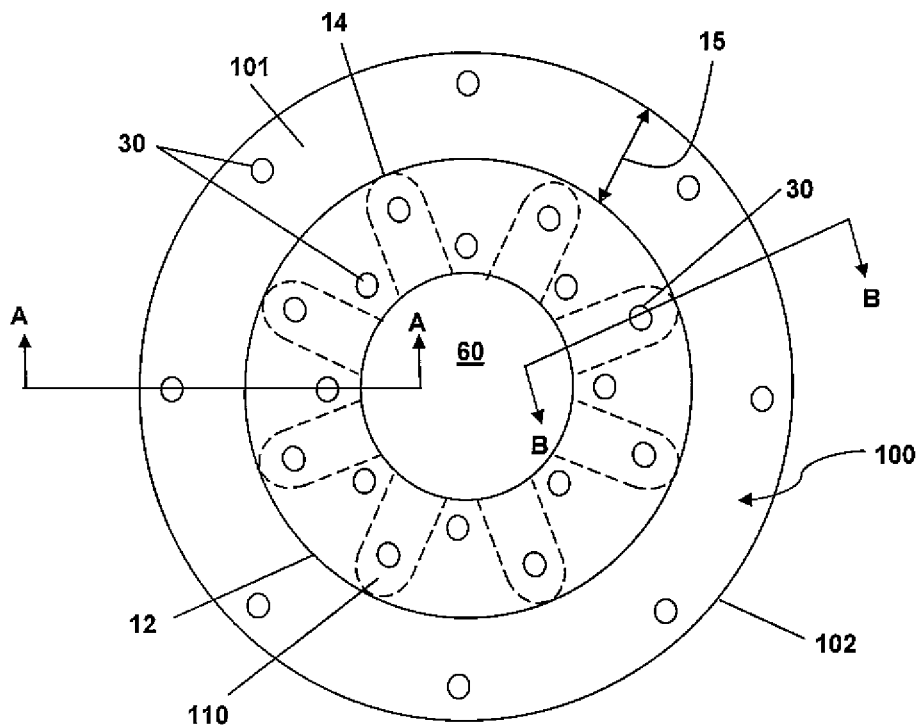
FIG. -3A-
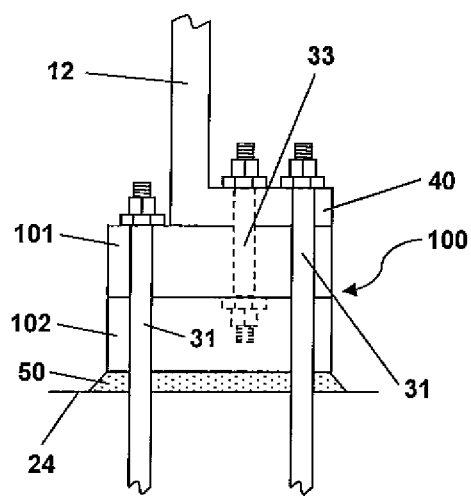
SECTION A-A
FIG. -3B-

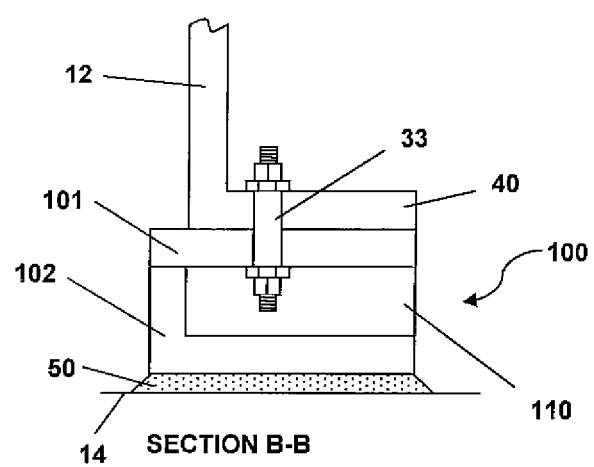
FIG. -3C-

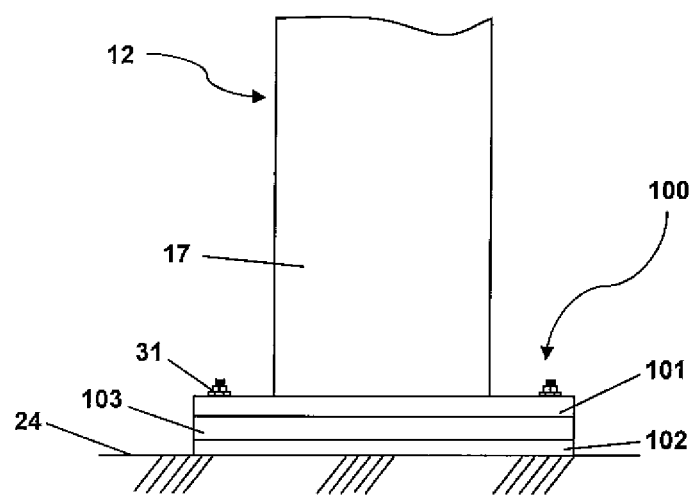
FIG. -4-

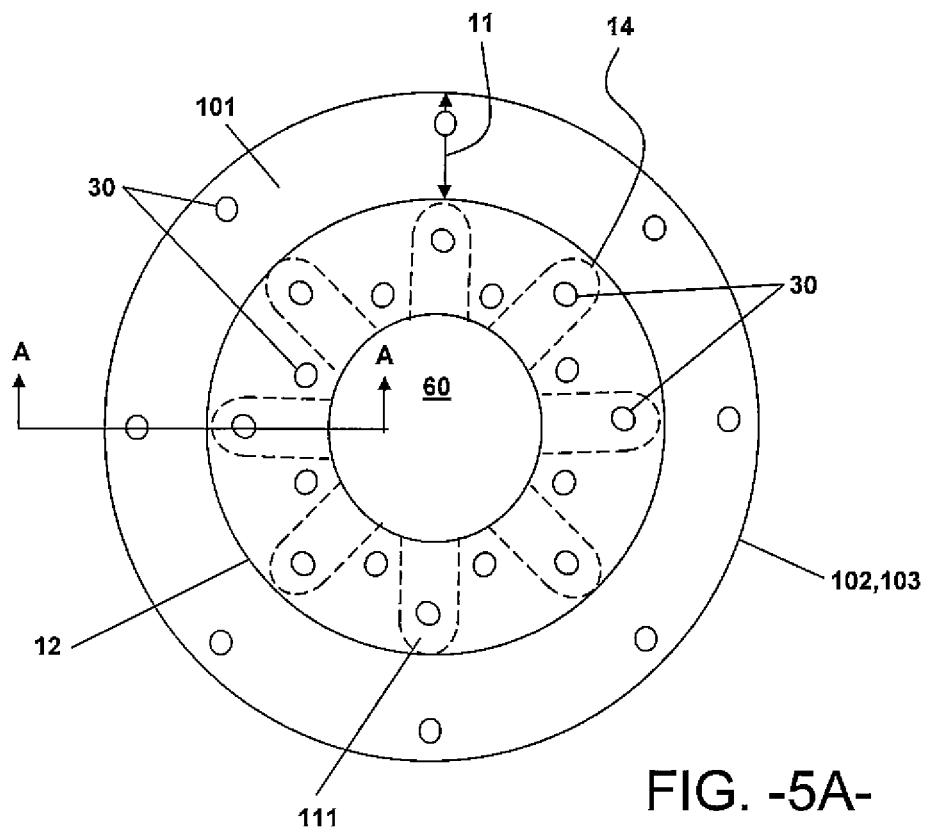
FIG. -5A-
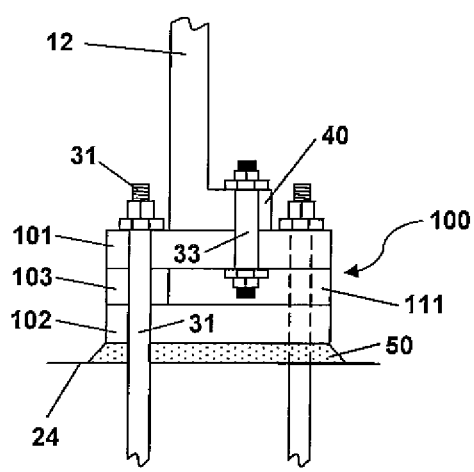
FIG. -5B-
SECTION A-A

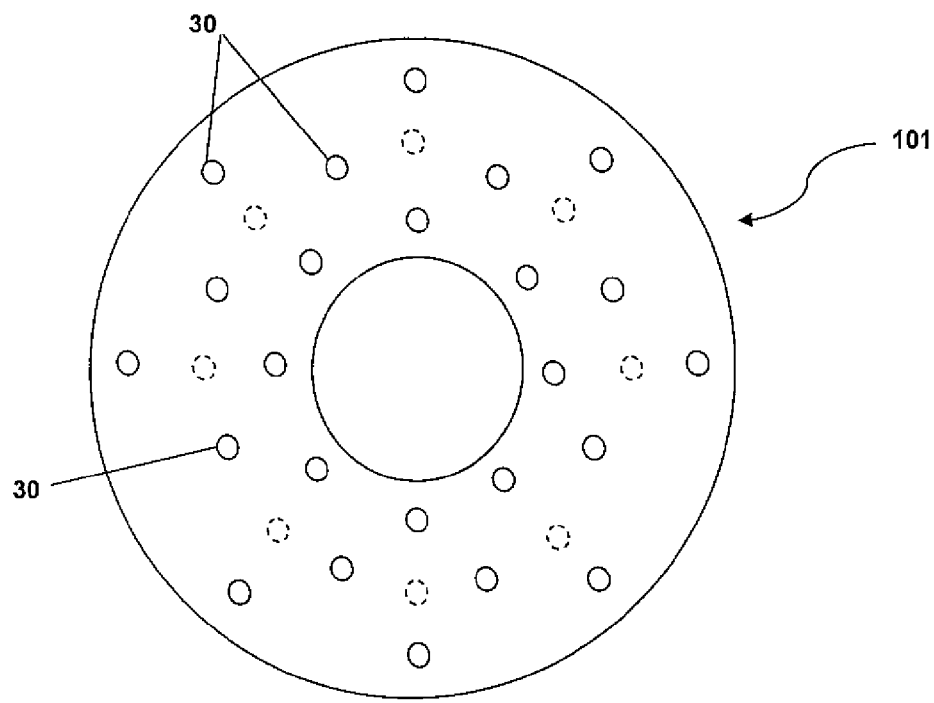
FIG. -6-
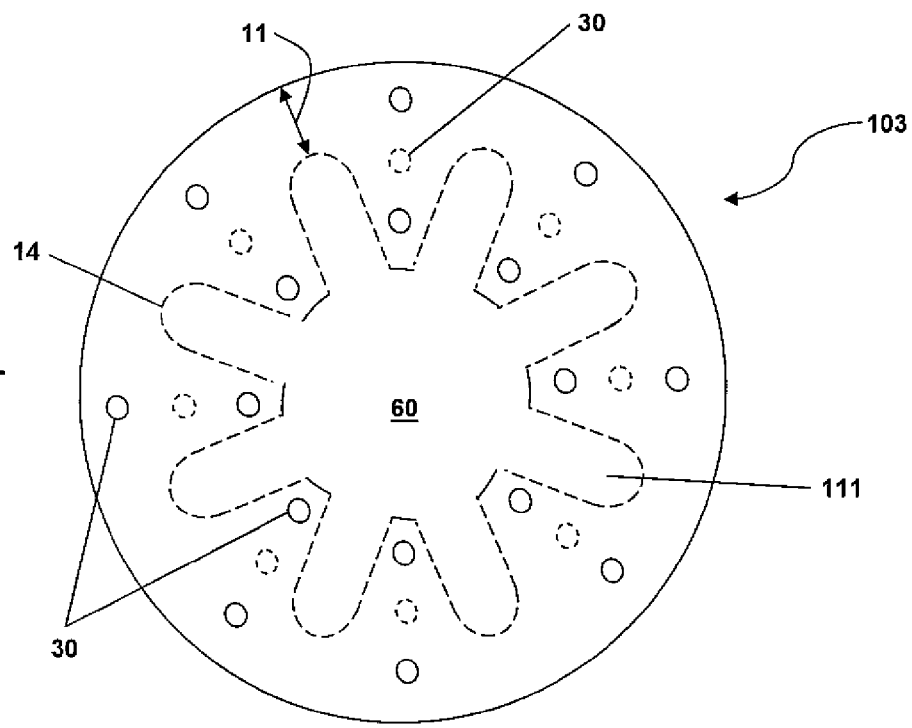
FIG. -7-

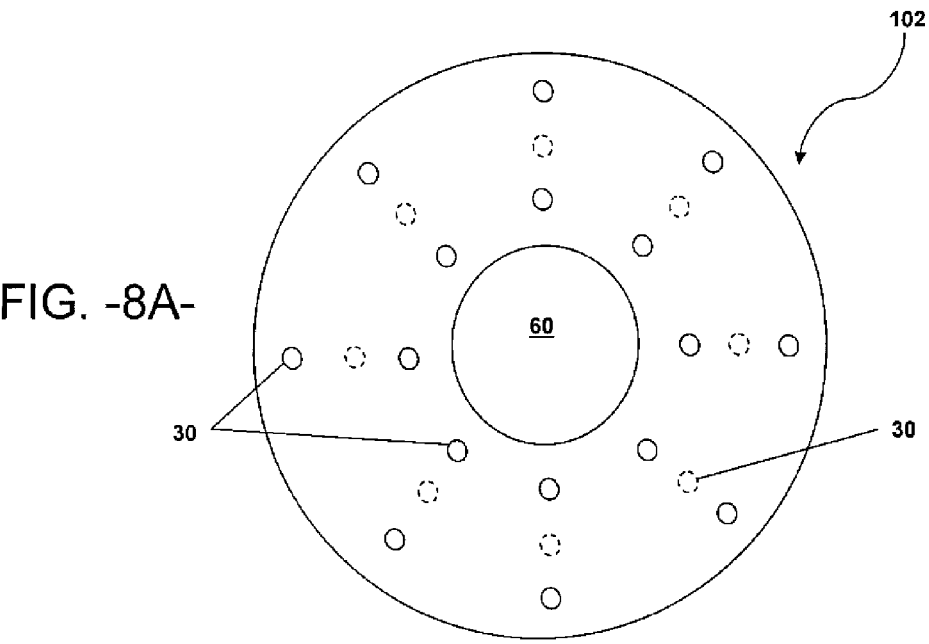
FIG. -8A-
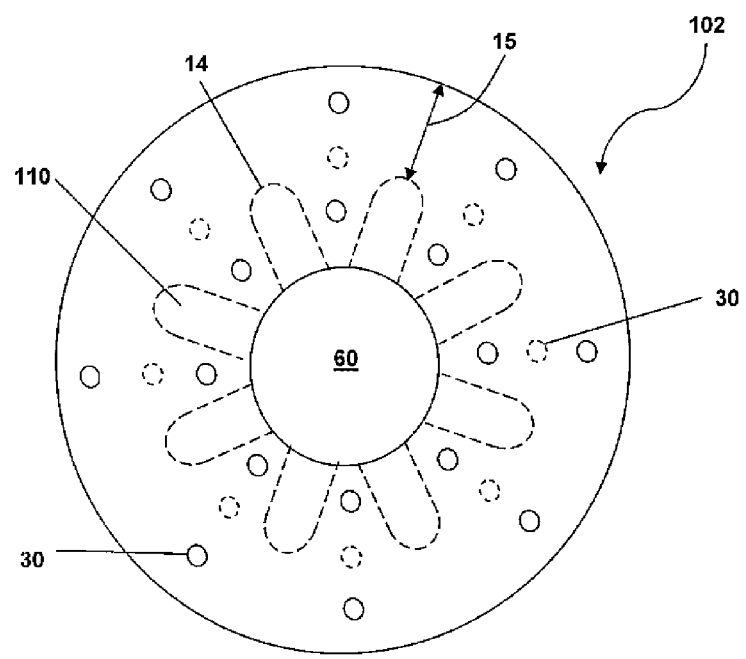
FIG. -8B-

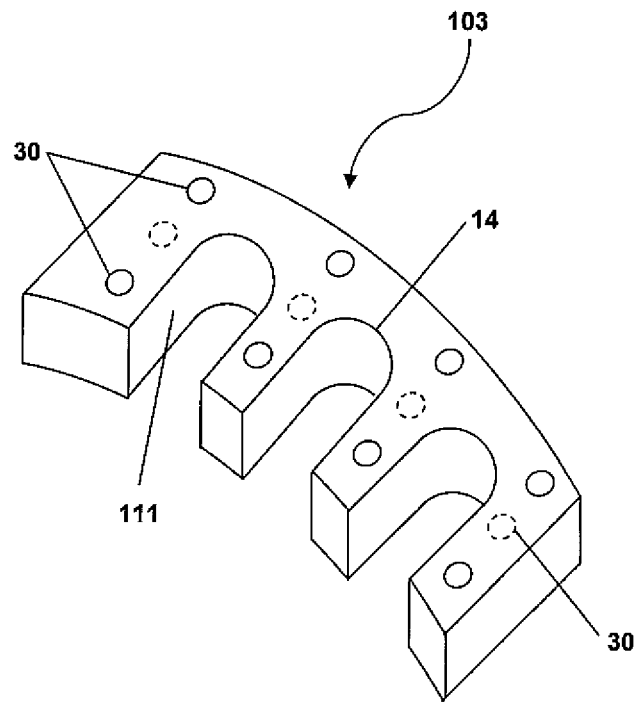
FIG. -9-
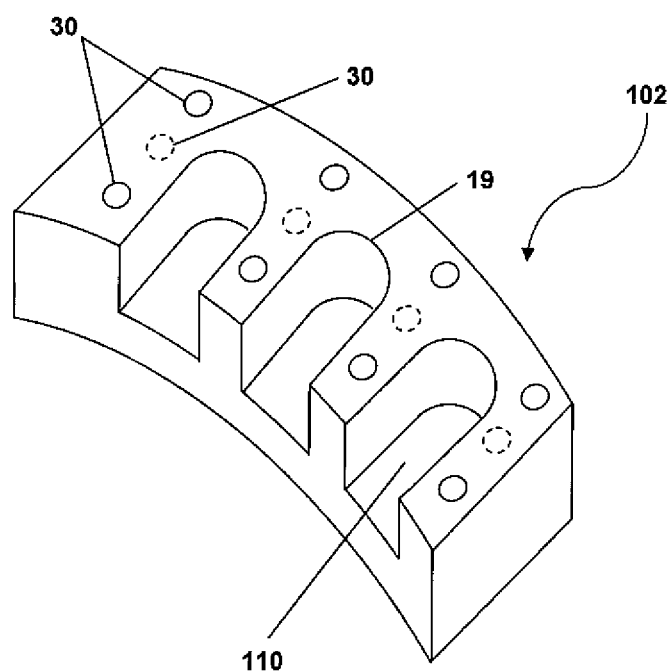
FIG. -10-

WIND TURBINE TOWER BASE ASSEMBLY WITH DETACHABLE TOWER BASE RINGS

FIELD OF THE INVENTION

The present invention relates generally to a tower base ring assembly capable of securing a wind turbine tower to a foundation, and more particularly, to a detachable tower base ring assembly.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

The tower typically includes a base section and an upper section. The base section of the tower is secured to a foundation. The foundation may be a concrete slab (raft) foundation, a short pole type foundation, a deep piling foundation, or any other suitable foundation capable of supporting loads produced by wind, turbine operation, and gravitational forces with usage of an anchor cage. A typical interface between the tower base portion and an anchor cage foundation has a bottom T-flange attached to a tower base adapter or a door section.

Due to high transportation and manufacturing costs, however, the tower base adapter and the door section are becoming prohibitively expensive. For example, the bottom T-flanges must be welded to the tower base adapter and/or the door section, which requires welding certification. Weld fatigue is a critical factor contributing to increased manufacturing costs. Further, the T-flange of the tower base adapter or the door section increases transportation costs because it exceeds the transportation size limits and restricts available routes. Additionally, the tower base adapter increases manufacturing costs due to the extra pair of L-flanges required to secure the tower base adapter to the base section of the tower.

By eliminating the tower base adapter and the door section, thereby eliminating the requirement of the welded T-flange, the tower outer diameter can be maximized to the transportation limit. Further, eliminating the tower base adapter or the door section allows the tower entry door to be located at a lower height above the foundation, saving costs associated with external stairs and structures. Additionally, the space inside the tower, where the extra pair of L-flanges from the tower base adapter is normally located, would be increased by removing the tower base adapter, thereby allowing easier access to maintenance and electrical equipment.

Accordingly, a wind turbine with an improved interface between the base section of the tower and the foundation would be desired in the art. For example, replacing the tower base adapter or door section T-flange with a detachable tower base ring assembly would be advantageous. The present invention, therefore, discloses a detachable tower base ring assembly that secures the L-flange of the base section of the tower to a foundation, which eliminates the need for a welded T-flange and an extra set of L-flanges of the tower.

BRIEF DESCRIPTION OF THE INVENTION

Aspects and advantages of the invention will be set forth in part in the following description, or may be obvious from the description, or may be learned through practice of the invention.

In one embodiment, a tower base ring assembly for securing a wind turbine tower to a foundation is disclosed. The tower base ring assembly includes two rings: a detachable top ring and a detachable bottom ring. The top ring is connectable to the wind turbine tower. The bottom ring has a plurality of troughs spaced circumferentially about an open center. The troughs extend radially from the open center towards an outer circumferential band of the bottom ring. Each trough has a closed outer circumferential end defined by the band. The troughs provide easy access for installations from inside the tower. The troughs may be formed in the bottom ring by any suitable manufacturing process. For example, in one embodiment, the troughs are milled out of the bottom ring. The width between the outer ends of the troughs and the outer diameter of the ring (e.g., the width of the circumferential band) may vary. For example, the width may be equal to or less than the length of a trough. In other embodiments, the width may be greater than the length of a trough.

The plurality of troughs can be any suitable shape, including U-shape, square, circular, triangular, rectangular, quadrilateral, trapezoidal, or similar.

In another embodiment, a tower base ring assembly for securing a wind turbine tower to a foundation includes three rings (a detachable top ring, a detachable middle ring, and detachable bottom ring). In the three-ring embodiment, the top ring is connectable to a wind turbine tower. The middle ring has an open center and is configured between the top ring and the bottom ring. The middle ring has a plurality of apertures spaced circumferentially about the open center. The apertures extend radially from the open center towards an outer diameter of the middle ring. Each aperture has a closed outer end defined by an outer circumferential band that defines the outer diameter of the middle ring and the outer diameter of the aperture. The width between the outer end of each trough and the outer diameter (e.g., the width of the circumferential band) may vary. For example, the width may be equal to or less than the length of an aperture. In other embodiments, the width may be greater than the length of an aperture. The plurality of apertures may be any of the following shapes, including U-shape, square, circular, triangular, rectangular, quadrilateral, trapezoidal, or similar. The middle ring and the bottom ring may be manufactured from the same plate stock; therefore, the plurality of apertures may be cut out of the middle ring without the need to mill out the plurality of troughs in the bottom ring. When assembled, the two-ring configuration and the three-ring configuration provide access for installation and maintenance from inside the tower either by the apertures of the middle ring or the troughs of the bottom ring.

In another embodiment, a wind turbine having a nacelle, a tower with an upper section and a base section, and a tower base ring assembly having a detachable two or three-ring configuration is disclosed. The base ring assembly may be in accordance with any one of the embodiments discussed above.

It should be understood that any tower base ring assembly disclosed herein may further include a plurality of openings for various functions. For example, the plurality of openings may be anchor bolt holes, connect bolt holes, screw holes, or any combination thereof. The anchor bolt holes, connect bolt holes, and screw holes may be located on the top ring, the middle ring, the bottom ring, or any combination thereof. The openings of the top ring are configured to align with the openings of the middle ring and the bottom ring when the tower base ring assembly is assembled. The plurality of openings may be in any arrangement appropriate for providing support between the wind turbine tower and the foundation.

Further, it should be understood that the diameter of the tower base ring assembly disclosed herein may be wider than the diameter of the wind turbine tower. Additionally, the base section of the tower may include an L-flange that is connectable to the top ring of the tower base ring assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates an elevation view of one embodiment of a tower base ring assembly securing a wind turbine tower to a foundation according to the present disclosure;

FIG. 3A illustrates a top view of another embodiment of a tower base ring assembly secured between a wind turbine tower and a foundation according to the present disclosure;

FIG. 3B illustrates a cross-sectional view of FIG. 3A at Section A-A according to the present disclosure;

FIG. 3C illustrates a cross-sectional view of FIG. 3A at Section B-B according to the present disclosure;

FIG. 4 illustrates an elevation view of one embodiment of a tower base ring assembly securing a wind turbine tower to a foundation according to the present disclosure;

FIG. 5A illustrates a top view of another embodiment of a tower base ring assembly secured between a wind turbine tower and a foundation according to the present disclosure;

FIG. 5B illustrates an elevation view of another embodiment of a tower base ring assembly secured between a wind turbine tower and a foundation according to the present disclosure;

FIG. 6 illustrates a top view of a top ring of a tower base ring assembly of a wind turbine according to the present disclosure;

FIG. 7 illustrates a top view of a middle ring of a tower base ring assembly of a wind turbine according to the present disclosure;

FIG. 8A illustrates a top view of one embodiment of a bottom ring of a tower base ring assembly of a wind turbine according to the present disclosure;

FIG. 8B illustrates a top view of another embodiment of a bottom ring of a tower base ring assembly of a wind turbine according to the present disclosure;

FIG. 9 illustrates a three-dimensional view of a middle ring of a tower base ring assembly of a wind turbine according to the present disclosure; and FIG. 10 illustrates a three-dimensional view of a bottom ring of a tower base ring assembly of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of one embodiment of a wind turbine 10. As shown, the wind turbine 10 includes a tower 12 extending from a foundation 24, a nacelle 16 mounted on the tower 12, and a rotor 18 coupled to the nacelle 16. The tower 12 includes a base section 17 and an upper section 13. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy.

As shown in FIG. 2, a simplified view of one embodiment of the base section 17 of the tower 12 secured to a foundation 24 by a tower base ring assembly 100 is illustrated. The tower base ring assembly 100 includes a detachable top ring 101 and a detachable bottom ring 102. The base section 17 of the tower 12 is secured to the tower base ring assembly 100 by connect bolts (not shown). The tower base ring assembly 100 is secured to the foundation 24 by anchor bolts 31. Anchor bolts 31 may be located outside of the tower (as shown), inside the tower, or both.

Referring to FIGS. 3A and 3B, a top view of a tower 12 secured to a tower base ring assembly 100 is illustrated. The tower base ring assembly 100 includes a detachable top ring 101 and a detachable bottom ring 102. The bottom ring 102 and top ring 101 have an open center 60 with plurality of troughs 110 spaced circumferentially about the center 60. The troughs 110 extend radially from the open center 60 towards a middle diameter of the bottom ring 102. Each trough 110 includes a closed outer end 14 spaced inwardly from the outer diameter of the ring by a width 15, which may vary between different embodiments. For example, the width 15 may be equal to or less than the length of a trough 110. In other embodiments, the width 15 may be greater than the length of a trough.

It should be appreciated that the troughs 110 are not limited by their shape. For example, the troughs may be any of a U-shape, square, circular, triangular, rectangular, quadrilateral, trapezoidal, or similar shape. For example, in the illustrated embodiment, the troughs 110 are U-shaped.

The top ring 101 and the bottom ring 102 may include a plurality of openings 30 used to secure the tower 12 to the tower base ring assembly 100 or to secure the tower to a foundation 24. For example, the plurality of openings 30 may be used for connect bolt holes, anchor bolt holes, screw holes, or any combination thereof.

The top ring 101 may be secured to the tower 12 by any appropriate means. Referring to FIGS. 3A, 3B, and 3C, for example, the top ring 101 may be bolted to a tower L-flange 40 by connect bolts 33. Further, as illustrated, the assembled tower bottom L-flange 40, the top ring 101, and the bottom ring 102 may be connected to the foundation 24 with anchor bolts 31. The anchor bolts 31 may be located inside the tower 12 and/or outside of the tower 12, as particularly illustrated in FIG. 3B. A grout material 50 may be provided to deliver further support between the tower base ring assembly 100 and the foundation 24.

Referring to FIG. 3C, it can be appreciated that the troughs 110 located in the bottom ring 102 provide access to the flange bolts 33 or nuts for installation and maintenance from inside the tower. The troughs 110 may be manufactured in the bottom ring 102 by any suitable forming means. For example, the troughs 110 may be milled out of the bottom ring 102.

Referring to FIG. 4, a simplified view of another embodiment is disclosed wherein the tower base ring assembly 100 includes a detachable top ring 101, a detachable middle ring 103, and a detachable bottom ring 102. The tower base ring assembly 100 is secured to the foundation 24 by anchor bolts 31. As illustrated, anchor bolts 31 are outside of the tower 12, however, it should be understood by those in the art that anchor bolts 31 may also be disclosed inside of the tower 12, or any combination thereof.

As shown in FIGS. 5A and 5B, the tower base ring assembly 100 includes a detachable top ring 101, a detachable middle ring 103, and a detachable bottom ring 102. Rings 101, 102, and 103 are stacked atop one another when assembled, and the assembled tower 12 and tower base ring assembly 100 are secured to foundation 24 by anchor bolts 31. The top ring 101, middle ring 103, and bottom ring 102 have an open center 60. The middle ring 103 has a plurality of apertures 111 spaced circumferentially about the center 60, with each aperture 111 having a closed outer end 14. The apertures 111 extend radially from the center 60 towards a middle diameter of the middle ring 103, and are offset from the outer diameter of the ring 103 by a width 11, which may vary (as discussed above). For example, the width 11 may be equal to or less than the length of an aperture 111. In other embodiments, the width 11 may be greater than the length of an aperture. In the illustrated embodiment, the width 11 is approximately equal to the length of the aperture 111. Further, the plurality of apertures 111 may be any of the following shapes: U-shape, square, circular, triangular, rectangular, quadrilateral, trapezoidal, or similar. In the illustrated embodiment, for example, the apertures 111 are U-shaped.

As shown in the cross-sectional view of FIG. 5B, the top ring 101 is bolted to a tower L-flange 40 by connect bolts 33. Further, as illustrated, the assembled tower bottom L-flange 40, the top ring 101, the middle ring 103, and the bottom ring 102 are connected to the foundation 24 with pre-stressed anchor bolts 31. A grout material 50 may be provided to deliver further support between the tower base ring assembly 100 and the foundation 24.

As shown in FIG. 6, an embodiment of a top ring 101 of a tower base ring assembly is disclosed. The top ring 101 is a circular plate having a plurality of openings 30. The plurality of openings may be used to secure the top ring 101 to an L-flange of a wind turbine tower or to a foundation. More specifically, openings 30 may be used for tower base connection bolts, optional screws, and foundation anchor bolts. The dashed lines represent optional locations. However, it should be understood by those skilled in the art that the plurality of openings are not limited to the arrangement illustrated and may be in any arrangement necessary for securing the base of a tower to a tower base ring assembly and/or for securing a tower to a foundation.

As shown in FIG. 7, an embodiment of a middle ring 103 of a tower base ring assembly is disclosed. The middle ring 103 is a circular plate with an open center 60 with a plurality of apertures 111 spaced circumferentially about the center 60, with each aperture 111 having an outer end 14. Further, the plurality of apertures 111 extend radially from the open center 60 towards an outer diameter of the middle ring and are offset from the outer diameter by width 11 around a periphery of the middle ring.

It should be understood that this invention includes multiple tower base ring assembly configurations including a two-ring configuration (a top ring and bottom ring) and three-ring configuration (a top ring, a middle ring, and bottom ring). FIG. 8A is one embodiment of a bottom ring 102 of a tower base ring assembly designed for a three-ring configuration, while FIG. 8B is one embodiment of a bottom ring 102 designed for a two-ring configuration. Referring to FIG. 8A, the bottom ring 102 is a circular plate having an open center 60 and a plurality of openings 30. Referring to FIG. 8B, the bottom ring is a circular plate with an open center 60, wherein a plurality of troughs 110 spaced circumferentially about the center extend radially from the open center 60 towards an outer diameter of the bottom ring. Each trough 110 has an outer end 14, wherein the outer ends 14 are offset from the outer diameter of the ring by a width 15 around a periphery of the bottom ring. As previously discussed, the width 15 may vary. Moreover, all configurations of the bottom ring 102 include a plurality of openings 30 for securing the tower to the tower base ring assembly and/or securing the tower base ring assembly to a foundation.

FIGS. 9 and 10 are three-dimensional views of a portion of the middle ring 103 and a portion of the bottom ring 102, respectively. FIG. 9 is a middle ring 103 with a plurality of apertures 111 spaced circumferentially about the center, with each aperture 111 having an outer end 14. Further, the middle ring 103 has a plurality of openings 30. FIG. 10 is one embodiment of a bottom ring 102 with an open center having a plurality of troughs 110 spaced circumferentially about the center, with each trough 110 having an outer end 14. Further, the bottom ring has a plurality of openings 30. FIGS. 9 and 10 illustrate a difference between the apertures 111 of the middle ring 103, which extend through the depth of the middle ring, versus the troughs 110 of the bottom ring 102, which are milled out and do not extend through the depth of the bottom ring.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine, comprising:

a nacelle;

a tower comprising an upper section and a base section supported on a foundation; and a tower base ring assembly connectable to the foundation, the tower base ring assembly comprising a top ring and a bottom ring having an open center, the top ring separate from and connected to the base section of the tower with connect bolts wherein the top ring and the bottom ring are detachable from one another, wherein the bottom ring comprises a plurality of troughs spaced circumferentially about the open center, the plurality of troughs extending radially from the open center towards an outer diameter of the bottom ring, each trough comprising an open radially inner end and a closed outer end that is offset from the outer diameter of the bottom ring by a defined width around the periphery of the bottom ring, the troughs aligned with the connect bolts such that the connect bolts extend vertically into the troughs and are accessible from the open center via the open radially inner ends of the troughs.

2. The wind turbine of claim 1, wherein the base section of the tower comprises an L-flange connected to the top ring of the tower base ring assembly with the connect bolts.

3. The wind turbine of claim 1, wherein a diameter of the tower base ring assembly is wider than the diameter of the tower.

4. The wind turbine of claim 1, wherein the top ring further comprises a plurality of vertical openings, and the bottom ring further comprises a plurality of vertical openings separate from the troughs, the vertical openings in the top ring aligned with the vertical openings in the bottom ring.

5. A wind turbine, comprising:
a nacelle;
a tower comprising an upper section and a base section supported on a foundation; and
a tower base ring assembly comprising a top ring, a bottom ring having an open center, and a middle ring having an open center, the top rim separate from and connected to the base section of the tower with connect bolts,
the middle ring sandwiched between the top ring and the bottom ring, the top ring, the middle ring, and the bottom ring detachable from one another,
wherein the middle ring comprises a plurality of apertures spaced circumferentially about the open center, the plurality of apertures extending radially from the open center towards an outer diameter of the middle ring, each aperture comprising an open radially inner end and a closed outer end that is offset from the outer diameter of the middle ring by a defined width around the periphery of the bottom ring, the apertures aligned with the connect bolts such that the connect bolts extend vertically into the apertures and are accessible from the open center of the middle ring via the open radially inner ends of the apertures.

6. The wind turbine of claim 5, wherein the top ring further comprises a plurality of vertical openings, and the bottom ring further comprises a plurality of vertical openings, the vertical openings in the top ring aligned with the vertical openings in the bottom ring.

7. The wind turbine of claim 5, wherein the base section of the tower comprises an L-flange connected to the top ring of the tower base ring assembly with the connect bolts.

8. A wind turbine, comprising:
a nacelle;
a tower comprising an upper section and a base section supported on a foundation; and
a tower base ring assembly connectable to a foundation, the tower base ring assembly comprising a top ring and a second ring having an open center, the top ring separate from and connected to the base section of the tower with connect bolts,
the top ring and the second ring detachable from one another,
wherein the second ring comprises a plurality of radially extending passages spaced circumferentially about the open center and extending radially from the open center towards an outer diameter of the second ring, each passage comprising an open radially inner end and a closed outer end that is offset from the outer diameter of the second ring by a defined width around the periphery of the second ring, the passages aligned with the connect bolts such that the connect bolts extend vertically into the passages and are accessible from the open center of the middle ring via the open radially inner ends of the passages.

9. The wind turbine as in claim 8, wherein the second ring is a bottom ring of the base ring assembly.

10. The wind turbine as in claim 9, wherein the passages are troughs having a bottom surface and an open top.

11. The wind turbine as in claim 8, wherein the base section of the tower comprises an L-flange connected to the top ring of the tower base ring assembly with the connect bolts.

12. The wind turbine as in claim 8, further comprising a bottom ring, wherein the second ring is a middle ring coupled between the top ring and the bottom ring, and wherein the top ring, the middle ring, and the bottom ring are detachable from one another.

13. The wind turbine as in claim 12, wherein the passages in the second ring are apertures having an open top and open bottom.

* * * * *